United States Patent [19]

Owen

[11] Patent Number: 5,476,889
[45] Date of Patent: Dec. 19, 1995

[54] CURABLE SEALER AND/OR ADHESIVE COMPOSITION, AND A METHOD FOR COATING SAME IN A DRY STATE WITH AUTOMOTIVE PAINT, AND COATED SUBSTRATES FORMED THEREWITH

[75] Inventor: Ian R. Owen, River Falls, Wis.

[73] Assignee: Minnesota Mining and Manufacturing Company, St. Paul, Minn.

[21] Appl. No.: 368,885

[22] Filed: Jan. 5, 1995

[51] Int. Cl.$^6$ .................................................. C08K 5/41
[52] U.S. Cl. .................. 524/170; 524/172; 524/236; 524/588
[58] Field of Search .................................. 524/170, 172, 524/588, 236

[56] References Cited

U.S. PATENT DOCUMENTS

| | | | |
|---|---|---|---|
| 3,730,939 | 5/1973 | Koch et al. | 524/172 |
| 3,971,751 | 7/1976 | Isayama et al. | 260/37 R |
| 4,444,974 | 4/1984 | Takase et al. | 528/33 |
| 4,923,927 | 5/1990 | Hirose et al. | 524/588 |
| 5,024,792 | 6/1991 | Havens | 264/22 |
| 5,063,270 | 11/1991 | Yukimoto et al. | 525/477 |
| 5,272,224 | 12/1993 | Baghdachi et al. | 524/188 |

OTHER PUBLICATIONS

ASTM Standard Designation No. D 3359–90, "Standard Test Method for Measuring Adhesion by Tape Test", publ. Dec. 1990, pp. 511–514.

*Primary Examiner*—Mark Sweet
*Attorney, Agent, or Firm*—Gary L. Griswold; Walter N. Kirn; Richard Francis

[57] ABSTRACT

A sealer or adhesive composition based on a polyoxyalkylene polymer having a silicon-containing hydrolyzable group, which has improved adhesion in a dried, cured state with a paint coating containing acrylic resins, acrylic-urethane resins, or urethane resins. The improvement involves the addition to such a sealer/adhesive composition of an alkylarylsulfonamide contained therein in an amount of least about 50 phr or more, by weight. The invention also pertains to a method applying and adhering a paint coating to such a sealer composition after it is dried.

9 Claims, No Drawings

CURABLE SEALER AND/OR ADHESIVE COMPOSITION, AND A METHOD FOR COATING SAME IN A DRY STATE WITH AUTOMOTIVE PAINT, AND COATED SUBSTRATES FORMED THEREWITH

BACKGROUND OF THE INVENTION

1. Field of the Invention

The present invention generally relates to a curable sealer and/or adhesive composition having improved adhesion to paints. The invention also relates to a method, and the coated substrates formed by the method, where a paint is coated over such a curable sealer/adhesive composition in a dry state to provide a paint, upon drying, having improved paint adhesion.

2. Description of the Related Art

It has been observed that certain conventional seam sealers based on polyethers having hydrolyzable silicon-containing end groups have exhibited poor adhesion to some automotive aftermarket paints when the paint is applied onto the sealers in instances where the sealers are previously allowed to cure dry for more than 12 hours before application of the paint thereon. Examples of such conventional seam sealers are described, for example, in U.S. Pat. No. 3,971,751 to Isayama et at. and U.S. Pat. No. 4,444,974 to Takase et at. It is often the case that a seam sealer will be applied onto the exterior a vehicle being repaired where the seam sealer, as applied on the vehicle, is left to cure for a relatively extended period of time, for example, while other projects demand a user's attention, or overnight or over a weekend before the user has an opportunity to apply the paint over the seam sealer. Since such unplanned or unavoidable extended delays can and do arise, in practice, before a paint can be applied to a previously applied sealer, it has been observed that the conventional silane-capped sealers have suffered in these circumstances from the drawback of exhibiting extremely poor paint adhesion and even adhesive failures. To address this problem, user was effectively required to plan and commit to completing both of the separate procedures of applying the seam sealer and thereafter applying the paint onto the seam sealer within a relatively short time frame to ensure adequate adhesion was formed betwen the seam sealer and the paint. Because of the often competing demands for the time of a user, this inconvenience and loss of flexibility in the timing for applying the different coatings is highly undesirable.

As can be understood from the above, the formulations of conventional seam sealers based on polyethers having silicon-containing hydrolyzable end groups which have been proposed to date, have disadvantages and as yet unsolved problems if allowed to cure for more than about 12 hours after application and then are used in conjunction with automotive paints.

U.S. Pat. No. 5,272,224 to Baghdachi et al. describe a one-component, moisture-curable polyurethane-based adhesive composition comprising a silane-terminated polyurethane of a prescribed formula, where the composition is useful for affixing glass panels directly to electrocoat painted metal substrates or over a primer comprising a polyurethane base polymer containing an electrocoat adhesion promoter. As one of the optional adjuvants for the composition described by Baghdachi et al., there is a flexibilizing agent added to the composition in amounts of from about 1.0 to about 10.0 parts by weight flexibilizing agent, preferably from about 2.0 to about 5.0 parts by weight, based on 100 parts by weight of the polyurethane base polymer. As suitable flexibilizing agents, Baghdachi et al. mention dioctyl phthalate, dibutyl phthalate, diundecyl phthalate, dioctyl adipate, butyl benzyl phthalate, iodecyldiphenyl phosphate, N-butyl-p-toluenesulfonamide, and N-ethyl-p-toluene-sulfonamide.

SUMMARY OF THE INVENTION

The present invention relates to a sealer or adhesive composition based on a polyoxyalkylene polymer having silicon-containing hydrolyzable end groups, which has improved adhesion with a dry, previously cured base or first paint coat containing acrylic resins, acrylic-urethane resins, or urethane resins. The improvement involves the addition and admixture to such a sealer/adhesive composition of an alkylarylsulfonamide in amounts, by weight, of at least about 50 parts or more sulfonamide per hundred pans resin, where the polyoxyalkylene base polymer is the "resin". For purposes of this invention, the terminology "phr" means "parts per hundred resin" and is denominated in weight.

More particularly, it has been found that the above-mentioned sealer/adhesive composition of this invention can be successfully topcoated after its application to a substrate and completion of its drying (curing) with a base coat or first coat of a multi-coat paint system, where the base coat incorporates a resin material of acrylic resin, acrylic-urethane resin or urethane resin, pigment and auxiliary polar solvents, to provide strong adhesion between the sealer and paint.

Surprisingly, it has been found that the alkylarylsulfonamide additive for the sealer provides for an efficacious bond between the sealer, after drying (curing) of same is completed, with a paint coating if the amount of sulfonamide additive, by weight, is at least about 50 phr. If smaller amounts of sulfonamide are added, such as beginning around about 45 phr, reduced adhesion is observed which can render the paint-to-sealer adhesion inadequate, while at lower amounts, failure of the bond between the paint and sealer surface can occur. On the other hand, if the amount of sulfonamide exceeds about 100 phr, by weight, residual surface tack problems can develop. A preferred range amount of sulfonamide additive for the sealer, by weight, is from about 75 phr to about 90 phr. The alkylarylsulfonamide is a chemically inert additive relative to the polyoxyalkylene base polymer; i.e., it does not chemically react with the base polymer before, after or during the curing of the base polymer.

Also, it has been determined that if the amount of sulfonamide falls below about 50 phr, by weight, the ensuing losses in paint adhesion cannot be compensated for by adding a different plasticizer material, such as a phthalate, to the sealer in addition to the amount of sulfonamide. Additionally, the use of the alkylarylsulfonamide additive with the polyoxyalkylene base polymer in the prescribed range of at least about 50 phr or more by weight also has been found to advantageously improve the paint to dry sealer adhesion without causing any associated serious drawbacks such as adversely affecting the cure rate and/or shelf life of the sealer composition as has been observed with other types of plasticizer chemistries such as with benzoates, phosphates, and adipates.

Useful alkylarylsulfonamides that have been found to so improve the compatibility and adhesion between the cured seam sealer composition and an automotive paint when used in amounts of at least about 50 phr or more include compounds represented by the general formula (A):

$$R_0\text{-}\emptyset'\text{-}S(O)ON(H)R_1 \tag{A}$$

where $R_0$ is a hydrogen atom or a methyl group, $\emptyset'$ is a phenylene group (i.e. $C_6H_4=$), and $R_1$ is a lower alkyl group having 1 to 8 carbon atoms. $R_1$ can be a substituted or unsubstituted, branched or unbranched, alkyl group having 1 to 8 carbon atoms. Nonlimiting examples of suitable sulfonamides of formula (A) include N-butyl-benzylsulfonamide, N-ethyl-benzylsulfonamide, N-butyl-p-toluenesulfonamide, N-ethyl-p-toluenesulfonamide, N-ethyl-o-toluenesulfonamide, and N-butyl-o-toluenesulfonamide, used individually or in any combination thereof.

In one embodiment of the sealer/adhesive composition of the invention, there is a curable sealer and/or adhesive composition comprising:

(a) a polyoxyalkylene polymer having a silicon-containing hydrolyzable group at each end of the molecule, where the polyoxyalkylene polymer has a structural unit of formula (I) represented by $(-R^1O-)_q$, where $R^1$ is an alkylene group having 1 to 4 carbon atoms and q is an integer providing a number average molecular weight for formula (I) of from about 500 to about 20,000, and the silicon-containing hydrolyzable groups each is independently represented by general formula (II):

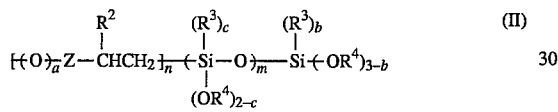

wherein Z is —R—, —R—O—R"—, —R—O—C(O)—, —C(O)NHR—, —C(O)NH—X—NHC(O)—NR"—R—, —C(O)NH—X—NHC(O)—O—R—, —C(O)NH—X—NHC(O)—S—R—, or —C(O)—R—, where R and R" are the same or different and each is a bivalent hydrocarbon group having 1 to 20 carbon atoms, X is an alkylene or aryl group having 1 to 20 carbon atoms, $R^2$ is a hydrogen, a hydrocarbon group having 1–20 carbon atoms, or a triorganosiloxy group, $R^a$ is a substituted or unsubstituted monovalent group having 1–20 carbon atoms or an organosiloxy group, $R^4$ is a saturated or unsaturated monovalent hydrocarbon group having 1–20 carbon atoms, a is 0 or 1, b is 0, 1 or 2, c is 0, 1, or 2, n is 0 or 1 and m is an integer between 0 to 18; and (b) at least about 50 phr or more, by weight, of an alkylarylsulfonamide.

Preferably, the polyoxyalkylene base polymer having a silicon-containing hydrolyzable end groups component of the sealer composition modified in the present invention contains at least 50% by weight, and even more preferably at least 80% by weight, of the $-R^1O-$ backbone chain units. By way of example, one suitable polyoxyalkylene polymer backbone for this invention is polypropylene polyether.

The polyoxyalkylene base polymer having the silicon-containing hydrolyzable end groups generally has a number average molecular weight between about 500 to about 20,000, and preferably 3,000 to 12,000. The polyoxyalkylene base polymer having the silicon-containing hydrolyzable end groups component of the invention typically has a viscosity &between about 100 cps and 200,000 cps at 15° C. At higher molecular weights beyond about 20,000, the viscosity of the polymer may become increased to the point where it is difficult to admix large amounts of any fillers that may be desired. To a certain extent, fillers can provide cost advantages by effectively replacing commensurate amounts of the more costly polymer material.

As the silicon-containing hydrolyzable groups represented by formula (II), each group ordinarily represents an end or terminal group of the polyoxyalkylene polymer. Also, it is preferred that the moiety $-OR^4$ in Formula (II) is an alkoxy group having 1–20 carbon atoms. An especially preferred class of silicon-containing hydrolyzable groups of formula (II) are those where the moiety $-OR^4$ is a methoxy group and where b has a value of 1. Although not thought to be within the preferred scope of the invention, the moiety $-OR^4$ also can be an acyloxy group, a ketoximato group, aminoxy or an alkenyloxy group, or even be replaced entirely by a halogen atom, amino group, amide group or mercaptide group.

In one highly advantageous application of the sealer composition of this invention, there is a method for applying and curing a coating composition on a cured sealer composition with excellent adhesion formed therebetween, comprising the steps of:

(1) providing a sealer composition that is curable upon exposure to moisture, comprising (a) a polyoxyalkylene polymer having a silicon-containing hydrolyzable group at each end of the molecule, wherein the polyoxyalkylene polymer comprises a structural unit of formula (I) represented by $(R^1O)_q$, where $R^1$ is an alkylene group having 1 to 4 carbon atoms and q is an integer providing a number average molecular weight for formula (I) of from about 500 to about 20,000, and the silicon-containing hydrolyzable groups each is independently represented by general formula (II):

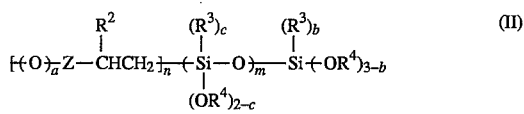

wherein Z is —R—, —R—O—R"—, —R—O—C(O)—, —C(O)NHR—, —C(O)NH—X—NHC(O)—NR"—R—, —C(O)NH—C—NHC(O)—O—R—, —C(O)NH—X—NHC(O)—S—R—, or —C(O)—R—, where R and R" are the same or different and each is a bivalent hydrocarbon group having 1 to 20 carbon atoms, X is an alkylene or aryl group having 1 to 20 carbon atoms, $R^2$ is a hydrogen, a hydrocarbon group having 1–20 carbon atoms, or a tfiorganosiloxy group, $R^3$ is a substituted or unsubstituted monovalent group having 1–20 carbon atoms or an organosiloxy group, $R^4$ is a saturated or unsaturated monovalent hydrocarbon group having 1–20 carbon atoms, a is 0 or 1, b is 0, 1 or 2, c is 0, 1, or 2, n is 0 or 1 and m is an integer between 0 to 18, and (b) at least about 50 phr or more, by weight, of an alkylarylsulfonamide;

(2) applying the sealer composition to a substrate in an environment containing moisture;

(3) curing the sealer composition completely to a dry state;

(4) applying a coating composition to said cured, dried sealer composition, where the coating composition comprises acrylic resin, pigment, and a polar solvent compound;

(5) drying the coating composition to adhesively bond the coating composition to the sealer composition.

In one further embodiment of the method of the invention, the applying of the coating composition to the sealer composition in step (4) is performed more than 12 hours, and even from three days or more, after applying the sealer composition to a substrate in step (2).

The curable sealer/adhesive composition of the invention can be provided in a caulk form or as a sprayable form. The viscosities of the caulk version are typically about 700,000 to about 1,200,000 cps, while the spray version is typically about 400,000 to about 700,000, or even as low as about 120,000 cps for speciality sprayable versions.

Other embodiments, features and advantages of the present invention will become apparent from the following description of the preferred embodiments.

DETAILED DESCRIPTION OF THE PREFERRED EMBODIMENTS

The addition of alkylarylsulfonamides to a seam sealer composition based on a hydrolyzable silane end capped polyether or polyoxyalkylene polymer, in amounts of at least about 50 phr or more, by weight, has been discovered, quite unexpectedly, to prevent adhesive failure and loss problems from arising in paint(s) applied to the seam sealer in a precured, dried state. The alkylarylsulfonamide material is physically dispersed in the sealer composition and it is chemically inert relative to the polyoxyalkylene base polymer during the curing reaction of the latter upon exposure to moisture.

Further, the use of the alkyarylsulfonamide additive with the polyoxyalkylene base polymer in the prescribed range of at least about 50 phr or more by weight also has been found to advantageously improve the paint to dry sealer adhesion without causing any associated serious drawbacks such as adversely affecting the cure rate and/or shelf life of the sealer composition.

Useful alkylarylsulfonamide materials that have been found to so improve the compatibility and adhesion between the cured seam sealer composition and a base coat when used in amounts of at least about 50 phr compounds represented by the general formula (A):

$$R_0\text{-}\emptyset'\text{-}S(O)ON(H)R_1 \quad (A)$$

where R0 is a hydrogen atom or a methyl group, $\emptyset'$ is a phenylene group (i.e. $C_6H_4=$), and $R_1$ is a lower alkyl group having 1 to 8 carbon atoms. $R_1$ can be a substituted or unsubstituted, branched or unbranched, alkyl group having 1 to 8 carbon atoms. Preferably, $R_1$ represents an aliphatic alkyl group of 1 to 8 carbon atoms, such as ethyl, propyl, or butyl. Nonlimiting examples of suitable sulfonamides of formula (A) include N-butyl-benzylsulfonamide, N-ethyl-benzylsulfonamide, N-butyl-p-toluenesulfonamide, N-ethyl-p-toluenesulfonamide, N-butyl-o-toluenesulfonamide, N-ethyl-o-toluenesulfonamide, used individually or in any combination thereof. Suitable sulfonamides include a mixture of N-butyl-p-toluenesulfonamide and N-ethyl-p-toluenesulfonamide available as Ketjenflex® 8 from Akzo Chemic America, Chicago, Ill.; n-butylbenzylsulfonamide available as Plasthall® BSA from C. P. Hall; and a mixture of N-ethyl-p-toluenesulfonamide and N-ethyl-o-toluenesulfonamide available as Rit-cizer® 8 from Rit-Chem Co. Inc., Japan. The alkylarylsulfonamide used in this invention should be in a liquid state at approximately room temperature (i.e., about 25° C.), so that it will not lose its plasticizing effect due to hardening or embrittlement.

Suitable commercial sources of the polyoxyalkylene base polymer having a silicon-containing hydrolyzable group that can be used in the sealer/adhesive composition of the present invention, include those available under the tradenames "SILYL SAT10", "SILYL SAT30", "MS S203", "MS S303", "SILYL SAT200", "MS 300" or "MS 20A", all manufactured by Kanegafuchi Kagaku Kogyo Kabushiki Kaisha, Osaka Japan, and mixtures thereof, such as a 50:50 mixture by weight of the sealer materials available under tradenames "SILYL SAT30" and "MS S303". All these polyoxyalkylene polymeric materials have a polypropylene backbone, and terminal end groups which are $-Si(OCH_3)_2CH_3$.

Further, the sealer material available under the tradename "SILYL SAT10" has a number average molecular weight of approximately 3,000. "SILYL SAT30" is lightly branched in the backbone with a number average molecular weight of about 5,000. "MS S203" has a linear backbone and a number average molecular weight of about 7,500. "MS S303" has a branched backbone and a number average molecular weight of about 8,500. "SILYL SAT30" is lightly branched and has a number average molecular weight of about 5,000. "SILYL SAT200" is lightly branched and has a number average molecular weight of about 8,000. "MS 300" is basically "MS S303" except it further contains 5% dioctyl phthalate. "MS 20A" is basically "MS S203" with 5% dioctyl phthalate added. These sealer materials are curable at room temperature in the presence of water moisture, such as atmospheric water moisture.

Other useful commercial sources of a polyoxyalkylene polymer having a silicon-containing hydrolyzable group comparable to the tradename "MS" chemistry that can be used in the present invention are sealer compositions available from Teroson, under the tradename "9320", and Kommefiing, under the tradename "K211" and "K222".

Fillers and plasticizers, in addition to the alkylarylsulfonamide material, optionally can be incorporated in the sealer/adhesive composition of the present invention to improve such properties as storage stability, adhesive capability, elongation at break and hardened mechanical strength.

Examples of such fillers include, for example, reinforcing fillers such as fumed silica, precipitated silica, silica aerogel and carbon black, and the like; other particle fillers such as calcium carbonate, magnesium carbonate, kaolin, talc, titanium dioxide, aluminum silicate, diatomaceous earth, ferric oxide and zinc oxide, and the like; ceramic microspheres or glass microbubbles; and fibrous fillers such as glass fibers and other filaments. The ceramic microspheres that can be used are those available under the tradenames "ZEOSPHERES" or "Z-LIGHT" from 3M. Treated calcium carbonate is preferred. Such treated calcium carbonates are available under the tradenames "ULTRAPFLEX", "SUPERFLEX", "HIPFLEX" and "HITHIX" from Specialty Minerals; and "WINNOFIL S", "SPT", "WMS" from ICI, "HUBERCARB M", "HUBERCARB Q" and "HUBERCARB S" from Huber. The above fillers can be used alone or in combination.

The filler can be contained in the sealer/adhesive composition in an amount of 0 to 500 pans by weight, preferably 0.1 to 300 pans by weight, per 100 pans by weight of the polyoxyalkylene base polymer. The more preferred amount of filler being 80–150 parts per 100 pans polyoxyalkylene base polymer for sub micron size filler, and 50–300 pans per 100 pans polyoxy-alkylene base polymer for greater than micron size such as when used with a thixotrope. Lower amounts of filler can lead to increased overall sealer cost and less reinforcing effect, while higher amounts of filler can lead to very viscous materials which are not easy to handle.

The optional additional plasticizers that also can be used in the invention to increase breaking elongation and facilitate use of larger amounts of fillers. Exemplary plasticizers include phthalates such as dioctyl phthalate, diisodecyl phthalate, butylbenzyl phthalate, chlofinated paraffin, epoxidized soybean oil, polyols and the like. Useful sources of phthalates include dioctyl phthalates and diisodecyl phthalates available under the tradenames "JAYFLEX DOP" and "JAYFLEX DDP", respectively, from Exxon Chemical; and a mixture of dioctyl adipate and butyl benzyl phthalate available under the tradename "SANTICIZER 97" from Monsanto Chemical, St. Louis, Mo. Other optional plasticizers include phosphates such as isodecyl diphenyl phosphate available under the tradename "SANTICIZER 148" from Monsanto Chemical, St. Louis, Mo. Useful polyol plasticizers include low number average molecular weight polyols in the 500–4000 range, such as the one available under the tradename series "PPG" from Arco Chemical Co.

The amount of such optional plasticizer used other than the amount of alkylarylsulfonamide employed generally can range from about 0 to 50 phr by weight of the polyoxyalkylene polymer component for either the caulkable or sprayable versions of the sealer of the invention. Lower amounts of plasticizer can reduce elastic properties, and can lead to reduced atomization for sprayable versions of the sealer of the invention. Higher amounts can lead to sticky or nontack free sealer compositions with long times needed to achieve a tack free and cured condition. Although not required, it is preferable to dehydrate the filler and/or plasticizer(s) by heat drying to decrease the water content before admixture to the sealer composition of the invention.

It is also possible to add other adjuvants such as a curing accelerator or catalyst to the polyoxyalkylene base polymer. The curing accelerator acts as a hardener to provide a one component room temperature curing composition. Where moiety —$OR^4$ in formula (II) is an alkoxy group, the curing velocity may be relatively slow, and, in that case, it is desirable to add a curing accelerator such as a dibutyltin acetyl acetonate, dibutyl tin oxide, dibutyl tin dilaurate, tin carboxylate, each alone or as combined with an amine cocatalyst. Other useful curing accelerators are described in U.S. Pat. No. 3,971,751. Useful sources of a catalyst include those available under the tradenames "DABCO" from Air Products, "TYZOR" from Dupont Chemical, "DOVERCAT" from Dover, "NIAX" from OSI. Useful sources of amine cocatalysts are those available from Akzo Company.

The curing accelerator generally is used in amount of between 0.2 to 5 weight parts, preferably 0.5 to 2 parts, based on 100 parts of the polyoxyalkylene base polymer. Higher amounts of the catalyst can lead to reduced shelf life, while lower amounts can lead to slower cure speeds. The amount of amine cocatalyst can be in the range of 0 to 10 parts per 100 parts polyoxyalkylene base polymer.

Thixotropes or antisagging agents that can be used include castor waxes, fumed silicas, treated clays, polyamides and the level of usage is not dependant on type of material, but generally it is greater than 0 to 10 parts per 100 parts polyoxyalkylene base polymer, by weight. The preferred thixotrope is polyamide used in an amount of 1–3 parts per 100 parts polyoxyalkylene base polymer, by weight. Lower amounts can lead to poor sag control and higher amounts can lead to unacceptably high viscosities. Useful sources of the thixotrope include those available under the tradenames "AEROSIL" from Degussa, "TS720" from Cabot, "CASTORWAX" from Caschem, "BENTONE", "THIXATROL" and "THIXCIN" from Rheox, and "DISLON" from King.

Other optional additives for the sealer/adhesive composition of the invention include any of an antioxidant, an adhesion promoter, a water scavenger, a colorant, a pigment, polar solvent, and a U.V. stabilizer.

U.V. stabilizers or antioxidants can be used in an amount of from 0–5 parts per 100 parts polyoxyalkylene base polymer. These materials improve heat stability and UV resistance, although the later effect is less important when the sealer composition of the invention is painted over. Useful sources of U.V. stabilizers and antioxidants include those available under the tradenames "TINUVIN 770", "TINUVIN 327", "TINUVIN 1130" and "TINUVIN 292" from Ciba-Geigy.

Useful adhesion promoters include various silanes. The mount of adhesion promoters can be used in an amount of from 0–5 parts per 100 parts polyoxyalkylene base polymer. Lower mounts can lead to poor adhesion while higher amounts can lead to increased brittleness of the cured sealer and increases cost. Useful sources of adhesion promoters include those available under the tradenames "A1120", "A187", and "A189" from OSI and "Z9020" from Dow Chemical.

Silanol condensation catalysts and water scavengers also can be used. For example, a hydrolyzable silicon compound stabilizer can be used as a water scavenger during storage. Other examples of water scavenger components include those exemplified in U.S. Pat. No. 4,444,974. A useful water scavenger includes the one available under the tradename "A171" from OSI. The water scavenger can be used in an amount of 0 to 10 parts by weight, preferably 1–3 parts by weight per 100 parts by weight polyoxyalkylene base polymer. Lower amounts of water scavenger can lead to faster cure rates but decreased shelf life and higher amounts can lead to excellent shelf life but greatly reduced cure and tack free times.

In the inventive process, the procedure for mixing of the polyoxyalkylene polymer, sulfonamide plasticizer, fillers, curing accelerator, and other additives may be performed in any convenient manner with any convenient equipment. However, in order to ensure good storage stability, it is preferred to dehydrate and remove any water residue of each component before mixing. Further, the mixing preferably should be conducted in an environment free of atmospheric water moisture. By preliminarily mixing all components, a single part type of sealing material can be provided. However, it is possible to divide the various components into two or more separate parts before complete mixing and provide a two (or more) part type of sealing system. When the sealing material is needed for use, the two parts would be mixed together at that time and applied.

Conventional mixing equipment can be employed for admixing the sealer composition components, such as a high shear or planetary mixer with mixing conducted under a vacuum or a nitrogen atmosphere with optional usage of heat. For example, an appropriate mixing vessel, such as high shear or planetary type, can be flushed with nitrogen and then the desired resin types, plasticizers including the alkylarylsulfonamide of the type used in this invention, and antioxidant and/or UV stabilizer and colorant are added thereto. If preparing a sprayable formulation of the sealer composition of the invention, a thixatrope is also added at this stage. Then, the mixture, whether intended ultimately for sprayable or caulkable versions, is mixed and heated (typically 60°–100° C.) for 15 minutes, and then the predried fillers are added. In the case of the sprayable formulation, these fillers typically are selected to have a 1 micron or greater average particle size and for the caulkable version the major filler should be submicron in size to control thixotropy. The above process scheme for the caulkable version without the step of adding a thixotrope is often preferred as it allows for making a much heavier bodied caulk grade sealer than by using a thixatrope/filler combination. However, it is to be understood that the caulk version optionally could be made including a thixatrope, as per the sprayable version, and with similar coarser fillers of greater size than 1 micron, if the heavier bodied grade is not required or desired.

In any event, the mixture at this stage is further high shear mixed at temperature and ideally under vacuum to further dehydrate for 15–180 minutes, typically about 45 minutes. The mixture is then cooled to 38°–43° C. and then a dehydrating silane is added. Then, further mixing and alehydrating is performed at this cooled temperature under nitrogen with high speed for 30–180 minutes, typically 45–60 minutes. Finally, the adhesion promotor, catalyst and any cocatalyst are added and mixed under vacuum for 15–60 minutes, typically about 15 minutes. The sealer/adhesive composition is then ready for packaging, preferably by a moisture free process.

The curable sealer/adhesive composition of the present invention should be maintained in an anhydrous state and not exposed to water and water moisture until used and applied to a substrate to mitigate and prevent premature cure. Preferably, the sealer/adhesive composition of the invention, including the admixture of the (a) polyoxyalkylene polymer and the (b) sulfonamide plasticizer material, as well as any optional additives, is hermetically sealed and packaged in an airtight manner by conventional means and equipment to curb premature cure before usage.

The inventive mixture of the polyoxyalkylene polymer and prescribed sulfonamide plasticizer material is useful as an elastic sealant of the single part type having desirable curing ability at room temperature and can be effectively employed for cars, roads, ships, aircraft, building construction, and other sealing applications in general. Also, the inventive mixture, solely or as assisted by a primer, can be effectively used as an adhesive for bonding a wide variety of surfaces, such as metal, porcelain, glass, wood, rubber, and polymeric material, and so forth.

Following the application and curing of the sealer, the motor vehicle body area including the area coated with the sealer is coated with paint coatings by conventional means such as air-spraying, airless spraying, electrostatic spraying, dipping, or brushing. These paint coatings may take the form of one or more pigmented coating layers (topcoat system), or one or more thin, pigmented basecoat layers with one or more overlying layers of clear topcoat (basecoat/clearcoat coating system).

In one preferred mode of the invention, the inventive sealant/adhesive composition is used to advantage in a wet-on-dry coating situation with a base paint coat to improve adhesion to the base coat. Exemplary acrylic resin solids and base coat compositions include those such as described in U.S. Pat. No. 4,730,020 to Wilfinger et al.

Examples of commercially-available automotive coats which have been found to achieve improvements in paint adhesion in conjunction with the inventive sealer composition include those available under the tradenames Sikkens Autocryl ®, Sikkens Autonova®, Sikkens Autobase®, products of Sikkens, Sassenheim Holland; "PPG DELTRON" universal basecoat and "PPG DELSTAR" acrylic enamel, from Pittsburg Paint & Glass Inc., Strongsville Ohio; "R-M DIAMONT" basecoat, from BASF Corp., Dearborn Mich.; and Sherman Williams "ULTRABASE 7", from Sherman Williams, Cleveland Ohio.

The application of the paint can be carded out in any convenient manner using any convenient equipment for this purpose. Preferably, the paint is applied over a substrate and the preapplied sealer composition as a uniform light coating. This can be accomplished by applying the paint on the substrate by compressed air spraying. Alternatively, the paint can be applied electrostatic spraying or air-assisted electrostatic spraying, or combinations thereof. After a flash-off time of about 5 to 10 minutes at room temperature, the paint can be wet-on-wet coated with additional paint layers or a transparent top coat. The transparent top coat, or so-called "clear coat", can be a conventional solvent-dissolved paint, water-dilutable paint, or powder coating involving one or two pan acrylic-based varnishes. The multiple coat is cured at the temperature required for any clear top coat.

Also, if a reduced flash-off time is desired, or in high humidity environments, it may be advisable to provide a hot-blast zone prior to the application of the transparent top coat.

The following nonlimiting examples will further illustrate the invention. All pans, percentages, ratios, and the like, in the following examples are by weight unless indicated otherwise. Further, the pans, percentages, ratios and the like for the sealer compositions are based on total weight of the sealer formulation unless indicated otherwise. For instance, "phr" means based on pans per hundred sealer resin, by weight.

EXAMPLES

Example 1

The effect of various polar plasticizers including alkylarylsulfonamide material, and its amount, on the adhesion between the seam sealer in a caulk version and paint were evaluated. The basic test protocol was as follows: prepare fully formulated seam sealers with the various plasticizers and amounts under study; apply each of them as a 3 to 5 mm thick film onto a fleshly dgreased cold-rolled steel panel; cure the sealers for a set time interval before painting them; then allow the paint to cure and test paint adhesion to the cured sealers using the standard of "ASTM D 3359-90 (Test Method B)" The standard ASTM D 3359-90 (Test Method B) was performed for each of the caulk sealer formulations prepared, as described below, on a paint surface applied to the sealer, where the paint had been permitted to dry three days (72 hours) after the paint had cured and also where the sealer earlier had been allowed to cure and dry three days (72 hours) before the paint was applied thereto. The paint adhesion was tested by ASTM D 3359-90 using Test Method B with the test tape chosen being 3M Scotchbrand® 898, available from 3M, St. Paul, Minn. The paint type used was Sikkens Autocryl® applied as per the manufacturer's instructions, which generally involved applying three successive coats of Sikkens Autocryl® at room temperature (about 25° C.) with a flash time of 5 minutes using an air pressure of 45 psi. The paint for the three coatings was prepared by mixing, by weight, 100 parts Sikkens Autoacryl® paint, 50 parts Autocryl® 1.2.3 Hardener, and 30 parts Sikkens 1.2.3. Reducer.

More specifically, the caulk formulations studied were prepared as follows. To a nitrogen flushed high shear reactor there was added 80 grams of polyoxyalkylene sealer having a silicon-containing hydrolyzable group available under the tradename "SILYL SAT30" and 120 grams of a different polyoxyalkylene sealer available under the tradename of "MS S303", 60 grams of the plasticizer indicated in Table 1 except for Run 1—1 representing the present invention where 100 grams of the indicated alkylarylsulfonamide plasticizer was employed, and 2 grams of antioxidant under the tradename "TINUVIN 770".

Therefore, for this study, the amount of plasticizer was only 33 phr by weight for comparison examples C-1 to C-6, while Run 1—1 employed 50 phr by weight sulfonamide plasticizer. The mixture was mixed at low shear for 5 minutes and then warmed to about 77° C. Then, 80 grams of ceramic microspheres under the tradename "ZEOSPHERES 200" was added with 240 grams of surface-treated calcium carbonate (0.07 micron) under the tradename "ULTRAP-FLEX", these being pre dried previously overnight at 104° C., and a full vacuum was applied and mixing with heat and high shear for 45 minutes. The mixture was cooled to 41° C. and the vacuum broken and nitrogen introduced into the reactor. Then 18 grams of N-methyl pyrrolidone and 4 grams of vinyl trimethoxy silane under the tradename "OSi Silane A171" was added and mixed for 45 minutes at this temperature at high shear and under nitrogen. Then 6 grams of N-beta (amino ethyl) gamma amino propyl trimethoxysilane obtained under the tradename "A1120", commercially available from OSi Specialites, Inc., and 4 grams of dibutyl tin diacetylacetonate catalyst were added and mixed for 15 minutes. The mixture was degassed for 2 minutes under full vacuum and then packaged immediately in a container flushed previously with nitrogen.

TABLE 1

| Run | Plasticizer | Paint Adhesion* | Other Observations |
|---|---|---|---|
| 1-1 | Sulfonamide[1] | 5B | |
| C-1 | Phthalate[2] | 0B | |
| C-2 | Benzoate[3] | 0B | Reduced shelf life |
| C-3 | Phosphate[4] | 0B | Loss of substrate adhesion |
| C-4 | Adipate[5] | 0B | Loss of cure rate |
| C-5 | Sulfonamide[6] | 0B | |
| C-6 | Sulfonamide[7] | 0B | |

[1] a mixture of N-ethyl-p-toluenesulfonamide and N-ethyl-o-toluenesulfonamide, obtained as Akzo Ketjenflex ® 8 from Akzo Chemie America, Chicago, Ill.
[2] diisodecyl phthalate, obtained as Exxon Jayflex ® DIDP from Exxon Chemical Co.
[3] dipropyleneglycol dibenzoate, obtained as Velsicol Benzoflex ® 9-88 from Velsicol Chemical Corp., Rosement, Ill.
[4] isodecyl diphenylphosphate, obtained as Monsanto Santicizer ® 148 from Monsanto Chemical Co., St. Louis, Mo.
[5] dioctyl adipate, obtained as Monsanto Santicizer ® 97 from Monsanto Chemical Co., St Louis Mo.
[6] a mixture of N-ethyl-p-toluenesulfonamide and N-ethyl-o-toluenesulfonamide, obtained as Akzo Ketjenflex ® 8 from Akzo Chemie America, Chicago, Ill.
[7] N-butyl benzylsulfonamide, obtained as Plasthall ® BSA from C. P. Hall.
*As defined per ASTM Standard D 3359-90, p. 513.

Example 2

The effect of various polar plasticizers including alkylarylsulfonamide material, and its amount, on the adhesion between the seam sealer in a sprayable version and paint were evaluated by the following test method, described more fully below.

To a nitrogen flushed high shear reactor was added 200 grams of polyoxyalkylene sealer having a silicon-containing hydrolyzable group available under the tradename "SILYL SAT30", the type(s) and amount(s) of plasticizer(s) as indicated in Table 2, and 2 grams of an antioxidant under the tradename "TINUVIN 770". Mixing was conducted at low shear for 5 minutes and then warmed to about 77° C. Then, 15 grams of a thixotrope under the tradename "DISLON 6500" was added and mixed at high shear for 15 minutes. Then, 300 grams of a surface-treated calcium carbonate (3 micron average) under the tradename "HIPFLEX", that had been predried over night at 104° C., was added, and a full vacuum was applied, and mixed with heat and high shear for 45 minutes. The mixture was cooled to about 41° C. and the vacuum broken as nitrogen was introduced into the reactor. Then, 34 grams of N-methyl pyrrolidone and 4 grams of vinyl trimethoxy silane obtained under the tradename "A171", commercially available from OSi Specialites, Inc., was added and mixed for 45 minutes at this temperature at high shear and under nitrogen. Then, 6 grams of N-beta (amino ethyl) gamma amino propyl trimethoxysilane obtained under the tradename "A1120", commercially available from OSi Specialites, Inc., and 4 grams of dibutyl tin diacetyl acetonate catalyst was added and mixed for 15 minutes. The mixture was then degassed with full vacuum for 2 minutes and then packaged immediately in a container flushed previously with nitrogen. The amounts of plasticizer in reported in Table 2 in phr by weight.

TABLE 2

| Run | Plasticizer type | Amount (by wt.) |
|---|---|---|
| CS-1 | Phthlate[a] | 90 phr |
| CS-2 | Benzoate[b] | 90 phr |
| CS-3 | Benzoate[c] | 90 phr |
| CS-4 | Phosphate[d] | 90 phr |
| CS-5 | Adipate[e] | 90 phr |
| CS-6 | Polyester[f] | 90 phr |
| 2-1 | Sulphonamide[g] | 90 phr |
| 2-2 | Sulphonamide[h] | 90 phr |
| CS-7 | Phthlate[i]/Phosphate[j] | 45 phr/45 phr |
| CS-8 | Phthlate[k]/Sulfonamide[l] | 45 phr/45 phr |
| CS-9 | Phthlate[m]/Sulfonamide[n] | 67.5 phr/22.5 phr |
| CS-11 | Sulfonate[o] | 90 phr |
| 2-3 | Phthalate[p]/Sulfonamide[q] | 22.5 phr/67.5 phr |
| 2-4 | Phthalate[r]/Sulfonamide[s] | 30 phr/60 phr |
| 2-5 | Phthalate[t]/Sulfonamide[u] | 36 phr/54 phr |

[a] Exxon Jayflex ® DIDP.
[b] Velsicol Benzoflex ® 9-88.
[c] a mixture of benzoate esters, obtained as Huls Nuoplaz ® 6159 from Huls Chemical Co.
[d] Monsanto Santicizer ® 148.
[e] Monsanto Santicizer ® 97.
[f] a polyester resin, obtained as Paraplex ® G-62 from C. P. Hall.
[g] Akzo Ketjenflex ® 8.
[h] C. P. Hall Plasthall ® BSA.
[i] Same as a.
[j] Same as d.
[k] Same as a.
[l] Same as g.
[m] Same as a.
[n] Same as g.
[o] alkyl sulfonic acid ester of phenol, obtained as Mesomall ® L-235 from Mobay Chemical Co.
[p] Same as a.
[q] a mixture of N-ethyl-p-toluenesulfonamide and N-ethyl-o-toluenesulfonamide, obtained as Rit-cizer ® 8 from Rit-Chem Co. Inc., Japan.
[r] Same as a.
[s] Same as q.
[t] Same as a.
[u] Same as q.

Then, the standard ASTM D 3359-90 (Test Method B) was performed for each of the above spray sealer formulations on a paint surface applied to the sealer, where the paint had been permitted to dry three days (72 hours) after the paint had cured and also where the sealer earlier had been allowed to cure and dry three days (72 hours) before the paint was applied thereto. In Table 3, "TFT" means "tack free time". For purposes of this invention, an acceptable paint adhesion score will be at least "4B", up to "5B"; according to the standards set forth in ASTM D 3359-90, p. 513. The paint adhesion was tested by ASTM D 3359-90 using Test Method B with the test tape chosen being 3M Scotchbrand® 898, available from 3M, St. Paul, Minn. The paint type used was Sikkens Autocryl® applied as per the manufacturer's instructions, which generally involved applying three successive coats of Sikkens Autocryl® at room temperature (about 25° C.) with a flash time of 5 minutes using an air pressure of 45 psi. The paint for the three coatings was prepared by mixing, by weight, 100 parts Sikkens Autoacryl® paint, 50 pans Autocryl® 1.2.3 Hardener, and 30 parts Sikkens 1.2.3. Reducer.

TABLE 3

| Run | Paint adhesion*/ failure mode** | Other Observations |
| --- | --- | --- |
| CS-1 | 0B/paint | |
| CS-2 | 2B/mixed | Cure rate slows; viscosity increases |
| CS-3 | 2B/mixed | Cure rate slows; viscosity increases |
| CS-4 | 3B/cohesive | Substrate adhesion loss; increased TFT |
| CS-5 | 1B/mixed | Increased TFT; but 1B adhesion after only 1 hour sealer cure*** |
| CS-6 | 0B/paint | Increased viscosity |
| 2-1 | 4B/cohesive | Accelerated the TFT |
| 2-2 | 5B/none | Accelerated the TFT |
| CS-7 | 0B/paint | Substrate adhesion loss; increased TFT |
| CS-8 | 3B/mixed | |
| CS-9 | 2B/paint | |
| CS-10 | 2B/mixed | Increased TFT and viscosity as aged |
| 2-3 | 5B/None | |
| 2-4 | 5B/None | |
| 2-5 | 4B | |

*As defined per ASTM Standard D 3359-90, p. 513.
**"paint" means failure of bond between paint and sealer surface; "cohesive" means the sealer fails cohesively, and "mixed" means both "paint" and "cohesive" failure occurred.
***This plasticizer negatively effected initial as well as long term paint adhesion.

The results of Examples 1 and 2 show that only the sulfonamide materials, and, further, the sulfonamide materials as used at a level of 50 parts per hundred resin (phr) or more, by weight, imparted the requisite paint adherability to the sealer.

While the invention has been described by reference to various specific and preferred embodiments and techniques, it is understood that many variations and modifications can be made thereto without departing from the spirit and scope of the invention.

What is claimed is:

1. A curable sealer and/or adhesive composition comprising:

(a) a polyoxyalkylene polymer having silicon-containing hydrolyzable end groups, wherein said polyoxyalkylene polymer comprises a structural unit of the formula (I):$(-R^1O-)_q$ (I), where $R^1$ is an alkylene group having 1 to 4 carbon atoms and q is an integer providing a number average molecular weight for formula (I) of from about 500 to about 20,000, and each said silicon-containing hydrolyzable end group having the general formula (II):

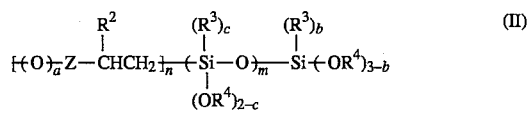

wherein Z is —R—, —R—O—R"—, —R—O—C(O)—, —C(O)NHR—, —C(O)NH—X—NHC(O)—NR"—R—, —C(O)NH—X—NHC(O)—O—R—, —C(O)NH—X—NHC(O)—S—R—, or —C(O)—R—, where R and R" are the same or different and each is a bivalent hydrocarbon group having 1 to 20 carbon atoms, X is an alkylene or aryl group having 1 to 20 carbon atoms, $R^2$ is a hydrogen, a hydrocarbon group having 1–20 carbon atoms, or a triorganosiloxy group, $R^3$ is a substituted or unsubstituted monovalent group having 1–20 carbon atoms or an organosiloxy group, $R^4$ is a saturated or unsaturated monovalent hydrocarbon group having 1–20 carbon atoms, a is 0 or 1, b is 0, 1 or 2, c is 0, 1, or 2, n is 0 or 1 and m is an integer between 0 to 18; and (b) an alkylarylsulfonamide material contained in an amount of from about 50 to about 100 parts by weight based on 100 parts by weight of said polyoxyalkylene polymer having a silicon-containing hydrolyzable group.

2. The curable sealer and/or adhesive composition of claim 1, wherein said said alkylarylsulfonamide material is contained in an amount of from about 75 to about 90 parts by weight based on 100 parts by weight of said polyoxyalkylene polymer having a silicon-containing hydrolyzable group.

3. The curable sealer and/or adhesive composition of claim 1, wherein said alkylarylsulfonamide material is represented by the general formula (A):

$$R_0-\emptyset'-S(O)ON(H)R_1 \qquad (A)$$

where $R_0$ is a hydrogen atom or a methyl group, $\emptyset'$ is a phenylene group, and $R_1$ is an alkyl group having 1 to 8 carbon atoms.

4. The curable sealer and/or adhesive composition of claim 1, wherein said alkylarylsulfonamide material is selected from the group consisting of N-butyl-benzylsulfonamide, N-ethyl-benzylsulfonamide, N-butyl-p-toluenesulfonamide, N-ethyl-p-toluenesulfonamide, N-ethyl-o-toluenesulfonamide, and N-butyl-o-toluenesulfonamide.

5. The curable sealer and/or adhesive composition of claim 1, wherein b is 1 and $R^4$ is a methyl group.

6. The curable sealer and/or adhesive composition of claim 1, wherein said polyoxyalkylene polymer comprises polypropylene polyether.

7. The curable sealer and/or adhesive composition of claim 1, wherein said polyoxyalkylene polymer has a number average molecular weight between 3,000 to 12,000.

8. The curable sealer and/or adhesive composition of claim 1, wherein said polyoxyalkylene polymer contains at least 50% by weight of said —$R^1O$— units of formula (I).

9. The curable sealer and/or adhesive composition of claim 1, said polyoxyalkylene polymer and said alkylarylsulfonamide material being uniformly mixed together.

* * * * *